United States Patent [19]

Bass et al.

[11] 4,262,332

[45] Apr. 14, 1981

[54] COMMAND PAIR TO IMPROVE PERFORMANCE AND DEVICE INDEPENDENCE

[75] Inventors: Walter E. Bass, Sunnyvale; Kenneth G. Beaman, Los Gatos, both of Calif.

[73] Assignee: International Business Machines Corporation, Armonk, N.Y.

[21] Appl. No.: 973,826

[22] Filed: Dec. 28, 1978

[51] Int. Cl.³ .............................................. G06F 9/00
[52] U.S. Cl. .................................................. 364/200
[58] Field of Search ................ 364/200 MS File, 300, 364/200

[56] References Cited

U.S. PATENT DOCUMENTS

| 3,292,151 | 12/1966 | Barnes et al. | 364/200 |
| 3,417,375 | 12/1968 | Packard | 364/200 |

OTHER PUBLICATIONS

Johnson, "Processing Multiple Records in a Disk Storage System", *IBM T.D.B.*, vol. 18, No. 10, Mar. 1976, pp. 3428-3429.

Yates, "New Channel Command Word Command", *I.B.M. T.D.B.*, vol. 18, No. 10, Mar. 1976, p. 3430.

*Primary Examiner*—Raulfe B. Zache
*Attorney, Agent, or Firm*—Walter J. Madden, Jr.

[57] ABSTRACT

A method and means are provided to facilitate the exchange of data between a direct access storage device (DASD) and a central processing unit (CPU). The data is stored in fixed length records on the DASD.

A pair of sequential commands are issued by the CPU to control access to the DASD data. The first command contains information which defines the boundaries of the DASD storage space which the CPU can access. The second command identifies the operation to be carried out within the permitted space defined in the first command and establishes where within the permitted space the activity is to take place.

The use of these two commands reduces the amount of CPU software involvement which is required for data accessing, particularly where the accessing involves the crossing of geometrical boundaries on the DASD.

9 Claims, 6 Drawing Figures

"DEFINE EXTENT" COMMAND

"LOCATE" COMMAND

COMMAND PAIR TO IMPROVE PERFORMANCE AND DEVICE INDEPENDENCE

TECHNICAL FIELD

This invention relates to methods and apparatus for controlling the transfer of data between a Central Processing Unit (CPU) and a Storage Device, and relates more particularly to such methods and apparatus for reducing the amount of CPU and CPU software involvement required for such transfer.

BACKGROUND ART

The present invention is applicable to many types of storage devices, such as disk files, tape drives, bubble memories, etc., and it will be described in the present application in an environment with Direct Access Storage Devices (DASD). The access of data on contemporary DASD units, such as disk files, has been accomplished through the use of a set of commands which direct the device to proceed to a specific geometric location and then process selected units of data found at that location. More specifically for example, in the IBM System 360 and System 370 CPU's, a CPU issues a series of commands, identified in 360/370 architecture as Channel Command Words (CCW's), which control the operation of the associated DASD.

The transfer of data between a 360/370 CPU and the accessed locations of storage devices utilizes a physical path connection involving a channel, a DASD control device communicating with the channel on one side in an asynchronous relationship and selected DASD devices on the other side. The operating system of the CPU initiates the transfer by a START I/O instruction, causing control to be relinquished to the channel, under control of a series of CCW's. A sequence or chain of commands is then sent from the CPU main storage over the channel to the control device for selecting and accessing the storage device as well as effectuating the data movement across the interface.

There are a number of costs associated with the initiation of data transfers between DASD and CPU main storage. These costs include a. The cost of the CPU switching "context" from what it is currently doing, to service channel interruptions, perform start I/O instructions, etc., at those points in time when interrupts occur and/or the channel, control unit, or device become available so that an operation may be initiated.

b. The cost of "non-privileged" code (i.e. user code or access method code) creating personalized copies of channel programs for each DASD operation which is to run in parallel (in time) with other operations. Channel programs in their addressing of main storage do not have the benefit of base registers, as does the CPU. Therefore, channel programs are generally not reusable, but instead must be built and personalized for each use.

c. The cost of the storage management function as exercised to obtain and release storage for personalized channel programs.

d. The cost of "privileged" software (i.e., the supervisor) translating main storage addresses as required by the dynamic address translation (DAT) mechanism for main storage.

e. The costs in the channel and control unit, in terms of resources used and time spent, in sequencing from command to command, transferring commands and data over one I/O interface, and the like.

All of these costs can be reduced by reducing the complexity and number of CCW's necessary to accomplish a DASD operation, and/or by reducing the number of I/O interruptions required for a DASD data transfer operation.

Further information about this type of operation between a channel and control unit is contained in the publication "IBM System 360 and System 370 I/O Interface Channel to Control Unit, Original Equipment Manufacturer's Information", IBM Publication No. GA226974.

COUNT-KEY-DATA ARCHITECTURE

A large number of current DASD devices use a Count-Key-Data (CKD) architecture for recording data. This architecture employs three distinct fields, a count field, a key field and a data field separated from each other by gaps. The count and key fields contain information relative to the record. The data field is of variable length and contains the data or information portion of the record. Part of the motivation for developing the CKD architecture was a desire to reduce the burden on a CPU user in organizing and accessing his DASD records. For this purpose, the Index Sequential Access Method (ISAM) was provided to permit low level associative searches on the CKD records to locate specific records.

The use of CKD architecture resulted in the generation and use of a relatively large number of CCW's to control the execution of different operations on the CKD records. For example, representative CCW's are READ COUNT, READ KEY and DATA, READ DATA; READ COUNT KEY and DATA, SEARCH KEY HIGH, SEARCH KEY EQUAL, SEARCH KEY HIGH OR EQUAL, SEARCH ID EQUAL, SEARCH ID HIGH, SEARCH ID HIGH OR EQUAL. A typical CCW chain might include READ COUNT, SEARCH KEY EQUAL; WRITE DATA.

Each CCW is separately resident in the CPU main store and must be fetched therefrom by the channel, decoded and transmitted to the control device for execution on the DASD. The time required to sequence from CCW to CCW and to pass the associated command to the control device (referred to as channel turn-around time), and the cumulative turn-around time for a string of CCW's such as identified above can be a significant factor in the operation of the overall system. As the rate at which DAS devices are capable of transmitting data increases, the channel turn-around time becomes a factor limiting the effective data transfer rate between the CPU and the DASD. In addition, under the CKD architecture, the DASD count, key, and data fields must be separated from one another to allow for channel turn-around between fields. This separation of the fields results in wasted DASD space, which has become a larger problem as DASD data rates have increased.

An additional characteristic of current DASD employing CKD architecture is that it requires that the user of the recorded data have an intimate knowledge of the physical structure of the DASD device and the geometric location of his data on that device. If the data is moved to a new location on the device, or if it is moved to a new device type, the set of accessing commands generated by the CPU must be modified to reflect the new geometric parameters.

If data belonging to multiple users is stored on a single DAS device, then a mechanism is required to ensure that individual users do not have access to data other than their own. In current DASD products, this is accomplished by a software supervisory function in the CPU which validates the initial access to the data and also validates each subsequent access which crosses a geometric boundary on the DAS device. This requires that the I/O operation be periodically interrupted for software validation and then restarted, thus degrading the overall data transfer performance of the system and incurring costs as summarized above.

SECTORIZED DASD RECORDS

In addition to the DAS devices employing CKD architecture as discussed above, some DAS devices, particularly those associated with "low-end" CPU's, use a fixed rather than variable length record format. The recording surfaces of such devices are divided into constant size blocks or records each having a permanent geometrically derived address. However, the CPU software continues to perform the task of addressing the DASD, with no real flexibility in hardware addressing present in the DASD control function.

PRIOR ART

The encapsulation (substitution) into a single message of a multi function single statement or of plural statements at one device for remote reception and execution by a second device is shown in Johnson 18 IBM TDB 3428, March 1976, "Processing Multiple Records in a Disk Storage System"; Yates, 18 IBM TDB 3430, March 1976, "New Channel Command Word Commands"; and Packard, U.S. Pat. No. 3,417,375. Johnson describes the Read Multiple Count Key Data (RMCKD) CCW, Yates discloses the Read Full Track (RFT) CCW, while Packard discloses the use of an instruction containing the starting point of an operation within the storage space and the next instruction.

The RMCKD CCW is a read CCW accessing a DASD track starting at any record after record 0 and reading from the specified starting record to the end of track without requiring the use of multiple read CCW's. Relatedly, a single RFT CCW is all that is required to read an entire DASD track into contiguous storage locations in CPU main memory.

In contrast, the inventive method involves the transmission of a conditioning CCW which avoids subsequent reinitiation of command chains each time a subsequent CCW accesses a track dissimilar to a present CCW, in addition to reducing the number of CCW's and I/O interrupts required in an average accessing chain. The art teaches away from the invention by disclosing the use of a single executable statement in the form of a marco + parameter as a substitute for multiple statements (RMCKD and RFT CCW's) or the multifunctional single statement with one or more location references therein as shown in Packard. There is no teaching in these references of the combination of a high function single statement combined with storage space description to minimize new CCW chain starts.

THE INVENTION

In accordance with the present invention, a pair of sequential commands are issued by the CPU to control access to DASD data which is recorded in fixed block form. The present invention capitilizes on the fixed length block form to make device geometry transparent to a CPU and its software and to reduce command transfers and interrupts between the CPU and devices. The first command contains information which defines the boundaries or "extent" of DASD storage space which the CPU can access. The second command identifies the operation to be carried out on the data within the permitted space defined in the first command and establishes where within the permitted space the activity is to take place. The command pair splits the transfer of control data to the DASD control device according to whether the data is "privileged" (supervisor) or "non-privileged" (non supervisor) data: the first command transfers "privileged" data, and the second command transfers "non priviledged" control data.

The DASD control device stores the extent information contained in the first command and compares this extent information with the information contained in the second command which is intended to establish where within the permitted space the activity is to take place. If this comparison indicates that the activity is to take place within limits permitted by the extent information in the first command, the operation called for by the second command proceeds within the defined space.

If the comparison indicates that the activity proposed is to take place outside the limits permitted by the extent information in the first command, the proposed activity is not permitted to take place and an error indication is generated.

The extent command (which is normally generated by the supervisor program) thus delimits an area or areas on the DAS device which contains a particular user's collection of data, and makes this definition known to the DASD control device. Any data access within the defined area or areas is verified and executed by the control device without any additional involvement by the CPU supervisory software function. This pair of commands effectively eliminates all geometric considerations at the user's level, resulting in a high degree of device independence in user software. The present invention provides a geometry independent linear address space, and all attached device types have a common software perception.

When multiple users share a single storage medium for the storage of information, procedures are required to prevent unauthorized access to that information. This is usually accomplished by a privileged or supervisory software function that validates each user's request for access to information.

The structure of the described command pair provides for a separation of the validation and access portions of any request. The user requests access by constructing an access request command and requesting that the supervisor function initiate an I/O operation. The supervisor constructs a validating access boundary command, appends it to the front of the access request command and then initiates the I/O operation. The control unit provides the final resolution between access boundary and access request and either accepts or rejects the access request. By enforcing the restriction that only one access boundary command may be issued in an I/O operation, the user is prevented from issuing his own access boundary and thus potentially validating access to other user areas.

The present invention reduces the costs of data transfers by reducing the size of channel programs, by reducing their logical complexity, and by reducing the number of I/O interruptions typically required for an operation. It a. reduces the size of channel programs by simplifying the addressing structure of the DASD, as seen by one "non-privileged user". The user sees the DASD as a simple, linear space, wherein a DASD address is specified with a single command, as opposed to the extent number/bin/cylinder/head/record number/angular position (MBBCCHHR$\theta$) address components and the seek/set sector/search ID/TIC address positioning command sequence which occurs in current DASD.

b. reduces the number of likely interruptions for a DASD operation by (1) more completely specifying the domain which "belongs" to the current "non-privileged" user (2) allowing addresses which are imbedded within DASD data which is read early in a channel program to be used directly to access subsequent data within the same channel program. (This was effectively prohibited before in that any such addresses would have been physical device addresses, and would have rendered the data set unmovable).

DESCRIPTION OF THE BEST MODE AND INDUSTRIAL APPLICABILITY

Figure 1:
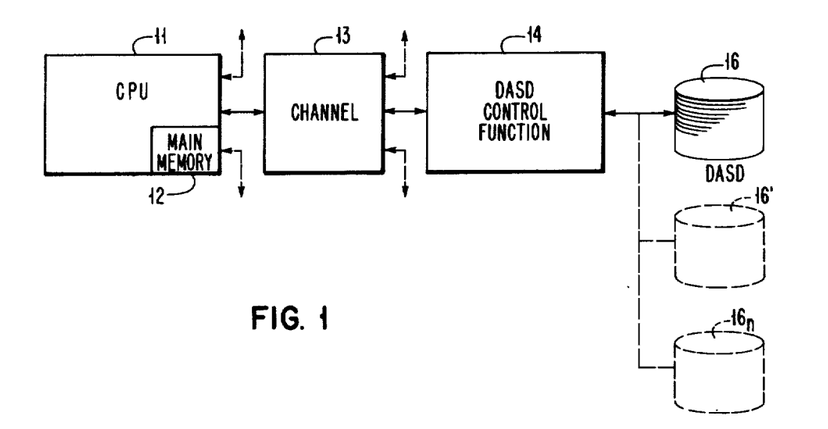
FIG. 1 is a block diagram showing a computer system in which the present invention may be employed.

Referring to FIG. 1, there is shown a schematic representation of a system in which the present invention may be employed. This system includes a central processing unit (CPU) 11 having a main memory portion 12. CPU 11 is shown connected to a channel 13, which in turn is connected to a DASD control function device 14. As is well known in the art, channel 13 may have other control devices connected to it in addition to control device 14, and CPU 11 similarly may have other channels connected to it in addition to channel 13. Device 14 may be a stand-alone DASD control unit, or may be a control device which is physically integrated into another unit such as CPU 11. One or more DAS devices 16 are connected to control device 14, up to a number 16$_n$.

In operation, data is transmitted between main memory 12 and DAS devices 16 through channel 13 and control device 14. Originally, data from CPU 11 is recorded on a DAS device 16, and subsequent operations may involve the reading of this recorded data back to main memory 12, the modification of the recorded data under the control of CPU 11, or the recording of additional data on device 16.

Control of the data transfer is performed by software or programming resident in CPU 11. This control is implemented by the execution of CCW's which are stored in main memory 12 of CPU 11 and which are retrieved and executed as required by channel 13. In practice, when an operation is to be performed involving a DAS device 16, CPU 11 issues a START I/O instruction which causes channel 13 to access a predetermined location in main memory 12 to locate a Channel Address Word (CAW). This CAW identifies for channel 13 the location in main memory 12 at which the first CCW to be executed is stored. Channel 13 then proceeds to this location to fetch and execute the first CCW, subsequently proceeding to fetch and execute subsequent CCW's necessary to perform the required DAS operation.

In accordance with the present invention, the new commands, which may be identified as "Define Extent" and "Locate", may be the first two CCW's in a string of CCW's utilized to perform a DASD operation on data recorded in fixed length records. In using the command pair, the user views his data as a collection of M fixed length blocks of length L. These blocks are numbered sequentially from 0 to M-1. The storage device is viewed as a collection of N fixed length blocks of suitable length. These device blocks are numbered sequentially from 0 to N-1. The length of user data set blocks may be the same as the length of the device blocks or an integral multiple of the device block length.

The command Define Extent is used to define to the device controller a mapping of all or part of the user's data blocks onto one or more groups of blocks on the storage device. The Define Extent command provides a list of parameters that define the mapping. The parameters are:

1. Execution mask
2. Number of extents defined
3. User block size
4. Beginning block number of the first defined segment in the user space ($b_1$)
5. Ending block number of the first defined segment in the user space ($e_1$)
6. Displacement from the origin of the storage device to the location of the first physical block of the first segment ($d_1$)
7. Beginning block number of the second defined segment in the user space ($b_2$)
8. Ending block number of the second defined segment in the user space ($e_2$)
9. Displacement from the origin of the storage device to the location of the first physical block of the second segment ($d_2$)
10.

.

.

The form of parameters 4, 5 and 6 is repeated for the number of extents defined in parameter 2. Parameters 4 and 5 may define the entire set of user data blocks ($b_1=0$ and $e_1=M-1$) or they may define a subset of the user blocks ($0 \leq b_1 \leq e_1 \leq M-1$). In the latter case, additional sets of parameters (such as 7 and 8) may be used to define additional subsets. Parameter 6 defines the block number on the storage device at which user block $b_1$ is recorded.

The Define Extent command delimits an area or areas on the storage device that contain a particular user's collection of data and makes that definition known to the device controller. Any data access within the defined area(s) is verified and executed by the device controller without additional involvement by supervisory software functions.

The command Locate identifies one or more blocks that are to be accessed and processed within the M blocks of user data. The Locate command provides a list of parameters that define these blocks and the type of processing that is to occur. The parameters are:

1. Operation code
2. Relative displacement in the data set of the first user block to be processed (m)
3. Number of sequential user blocks to be processed (k)

The operation code in parameter 1 predefines the type of data operation that is to be initiated when the physical access to data is complete and permits the optimization of orientation to that data (e.g., orient for read or orient for write). The block number is parameter 2 specifies one block in the set of user data blocks ($O \leq m \leq M-1$). This is the first (or only) block of data to be processed. Parameter 3 specifies the number of sequential blocks to be processed by subsequent data transfer commands, beginning with the block specified in parameter 2.

The device controller, using the parameters provided in the Define Extent command, translates the block numbers contained in the Locate command to the corresponding block numbers on the storage device. If any of the user blocks specified by the Locate command are not within the defined space(s) on the storage device, an exception condition is returned to the CPU. If all of the specified user blocks are within the defined space(s) on the storage device, the device controller converts the device block numbers to geometric addresses for the particular device and initiates an access. Using the operation code from the Locate command, the device controller provides the required orientation and verification necessary to initiate the following operation (such as read or write).

Figure 2:
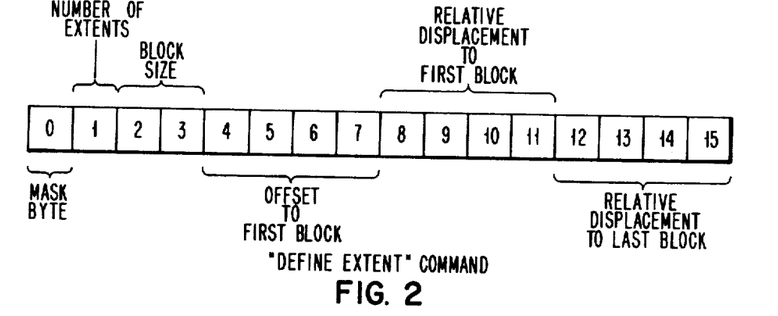
FIG. 2 shows a representative "Define Extent" command in accordance with the present invention.

FIG. 2 shows the arrangement of a typical Define Extent command defining a single extent. This example on the command consists of 16 bytes, 0–15, each byte consisting of 8 individual bits. The first byte, byte 0, is identified as the Mask byte, and serves to identify which Write and Diagnostic operations, if any, are not permitted in the defined DASD operation. Prohibited write operations could be "Write" or "Write Format". This Mask byte generally conveys the same information relative to Write operations as the "Set File Mask" CCW in CKD architecture.

Bytes 2 and 3 of the Define Extent command convey information as to the size, usually expressed in bytes, of a given logical fixed length block or record. This is an integral multiple of the length of the physically recorded blocks on the DAS device. The length of such a block or record in a representative DAS device could be 512 bytes. Byte 1 identifies the number of extents which are defined in the command.

Bytes 4–7 define the offset in blocks from the beginning of the media on the DAS device to the first block of the defined extent. Bytes 8–11 define the relative displacement in blocks from the beginning of the user's data set to the first block of the defined extent. Bytes 12–15 define the relative displacement in blocks from the beginning of the user's data set to the last block of the defined extent.

It will be seen that the Offset bytes 4–7 define the location of the first block of the extent in terms of that block's physical location on the DAS device, while bytes 8–11 and bytes 12–15 define the relative displacement of the first and last blocks of the extent in terms of the user's data set.

Figure 3:
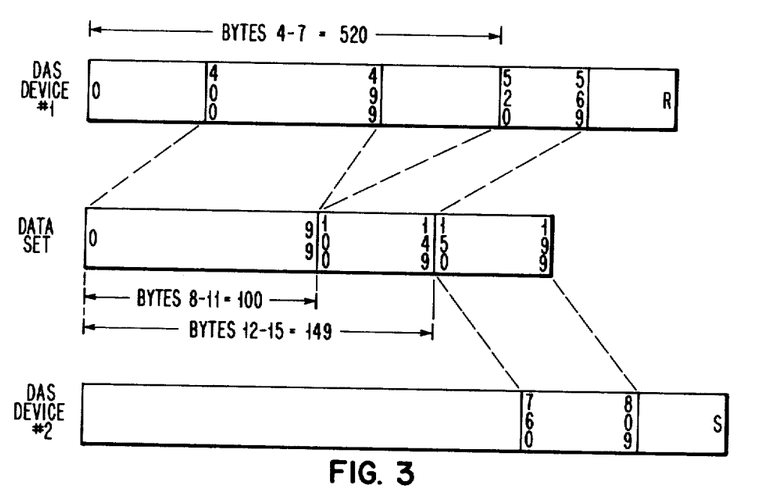
FIG. 3 illustrates the arrangement of data on a DAS device and its relationship to the arrangement of data in a user's data set, showing the parameters of the "Define Extent" command as applied to these data arrangements.

This may be understood from FIG. 3, which diagrammatically illustrates the relationship of the parameters of a Define Extent command to the arrangement of data on the DAS device and within the user's data set. In FIG. 3, the record areas of two DAS devices are shown schematically. Device #1 has blocks numbered from 0 through R and Device #2 has blocks numbered from 0 through S. It will be understood that DAS devices 1 and 2 may be separate disk files, or any other entities which appear as separate volumes to the using system.

The user's data set is shown as comprising 200 blocks, numbered from 0 through 199, with some of the user's data set recorded on Device #1 and the remainder recorded on Device #2. For illustrative purposes the user's logical block size is here assumed to be equal to the physical block size of the DAS device. User's records 0–99 are recorded in blocks 400–499 of device #1, user records 100–149 are recorded in blocks 520–569 of Device #1, the user records 150–199 are recorded in blocks 760–809 of Device #2. As is well known, it is not uncommon in DASD operations for user data sets to be distributed on more than one DAS device in the manner represented in FIG. 3.

Assuming that access is desired to some portion of the user's data set represented by records 100–149, the present invention would operate as follows to ensure access to those records, and only those records, with a minimum of software intervention from CPU 11. A Define Extent command is generated having the general format shown in FIG. 2. The Mask byte, byte 0, may be encoded to permit or prohibit certain Write and Diagnostic commands, as discussed above. Bytes 2–3 define the logical block length and may employ, for illustrative purposes, a block length of 512 bytes.

Bytes 4–7 would contain a block count of 520, which represents the offset in blocks from the beginning of the media on Device #1 (block 0 on Device #1) to the first block of the extent (block 520). It will be seen that block 520 on Device #1 contains the first desired block, block 100, of the user data set which is to be the subject of the DAS operation.

Bytes 8–11 of the Define Extent command contain a count of 100 representing the displacement in blocks within the user data set to the first block of the extent (Block 100). Bytes 12–15 of the Define Extent command contain a count of 149, representing the displacement in blocks within the user data set to the last block of the extent (Block 149).

This Define Extent command is transferred from CPU 11 to DASD control device 14, where it is decoded and retained for the duration of the present CCW chain. One operation which is performed by control device 14 after decoding the Define Extent command is to determine whether the offset and range of the extent are physically located on the addressed DASD 16. If they are not, meaning that some part of the defined extent is not accessible to the addressed device, an exception condition is signalled to the system. If control device 14 establishes that the defined extent lies within the addressed DASD 16, operations are allowed to continue.

Figure 4:
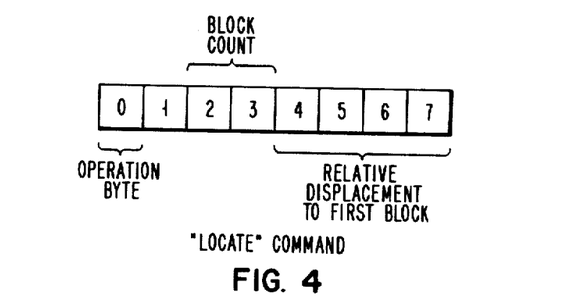
FIG. 4 shows a representative "Locate" command in accordance with the present invention.

After successful transfer of the Define Extent command to the DAS control device 14, the "Locate" command is transferred. A representative format of a Locate command for use with a Define Extent command as shown in FIG. 2 is shown in FIG. 4. This command is shown having 8 bytes, 0–7, each byte again containing 8 bits. The first byte, byte 0, is identified as the Operation byte and it defines the operation to be performed by the DAS device upon completion of any required DAS device access motion. Representative operations which may be specified by byte 0 are READ DATA, WRITE DATA, WRITE AND CHECK DATA, and FORMAT DEFECTIVE BLOCK. Data transfer between the DAS device and the CPU does not occur during the execution of the Locate command. Data transfer is initiated by a READ CCW or WRITE CCW which follows the Locate command.

Bytes 2–3 of the Locate command are identified as the block count bytes and specify the number of sequential logical blocks to be processed by the command immediately following the Locate command. Bytes 4–7 of the Locate command specify the relative displacement in logical blocks from the beginning of the data set to the first block to be processed in the subsequent operation.

Assume that a READ operation is to be performed on blocks 120–139 of the user data set shown in FIG. 3. Under these circumstances, the Operation byte, byte 0, of the Locate command would be encoded to designate a READ operation. Block count bytes 2–3 would contain a count of 20, representing the number of blocks or records to be read from the user data set. Displacement bytes 4–7 of the Locate command would contain a count of 120, representing the displacement from the beginning of the data set to the first block to be processed.

After control device 14 decodes the Locate command, it compares the relative block displacement of the blocks to be processed against the logical extent limits established by the preceding Define Extent command. Control device 14 accomplishes this by comparing the count of displacement bytes 4–7 and the block count of bytes 2–3 of the Locate command with the count of displacement bytes 8–11 and bytes 12–15 of the Define Extent command. In the present example, assuming that it is desired to read user records 120–139, these records are within the define extent of the Define Extent command, so the operation may proceed.

When the operation byte 0 is decoded as either READ or WRITE, and after checking for validity, control device 14 initiates certain actions to gain access to the device data. Such action may include the initiation of a SEEK operation on the selected DAS device and the operation SET SECTOR for the first block of the extent. Details of these operations for a representative DASD control unit are given in the publication "Reference Manual for IBM 3830 Storage Control Model 2", IBM Publication No. GA26-1617. Briefly however, a SEEK operation involves movement of a DAS device actuator to position a transducer at a given track location on the DAS device. A SET SECTOR operation for those DAS devices provided with a Rotational Position Sensing feature involves obtaining the sector number for the disk file sector at which the desired record begins. This sector number is then used to determine when the desired record is approaching the read or write position on the DAS device, at which time the device may be reconnected to the control device for processing operations when the desired record reaches the read or write position.

Device 14 converts the relative displacement for the first block specified in bytes 4–7 of the Locate command to the appropriate values for the addressed DAS device and initiates an access to that physical location on the addressed device. Such access initiation may involve the setting in motion of a movable actuator in one of devices 16 carrying one or more transducers, to position one transducer over the track containing the first data block to be processed. Alternatively, the access may involve the switching from one transducer to another in a "cylinder" on a given DAS device. After the initiation of this access, device 14 may disconnect from device 16 and be available for servicing other DAS devices.

When access to the first block is completed, control device 14 signals that it is ready to receive the next CCW. In the case of a READ operation, this next CCW is "READ". Upon receipt and decoding of the CCW, device 14 reads the block identification of the first block. If this identification matches that of the desired block, Device 16 reads the following 512 byte data block and transfers it to channel 13 and CPU 11. This process continues until the block count, set by the contents of bytes 2–3 of the Locate command, reaches zero, at which time the Read operation will be terminated. If access boundaries are encountered during data transfer, control device 14 internally performs the required access movement, without requiring intervention by channel 13 or CPU 11.

Figure 5:
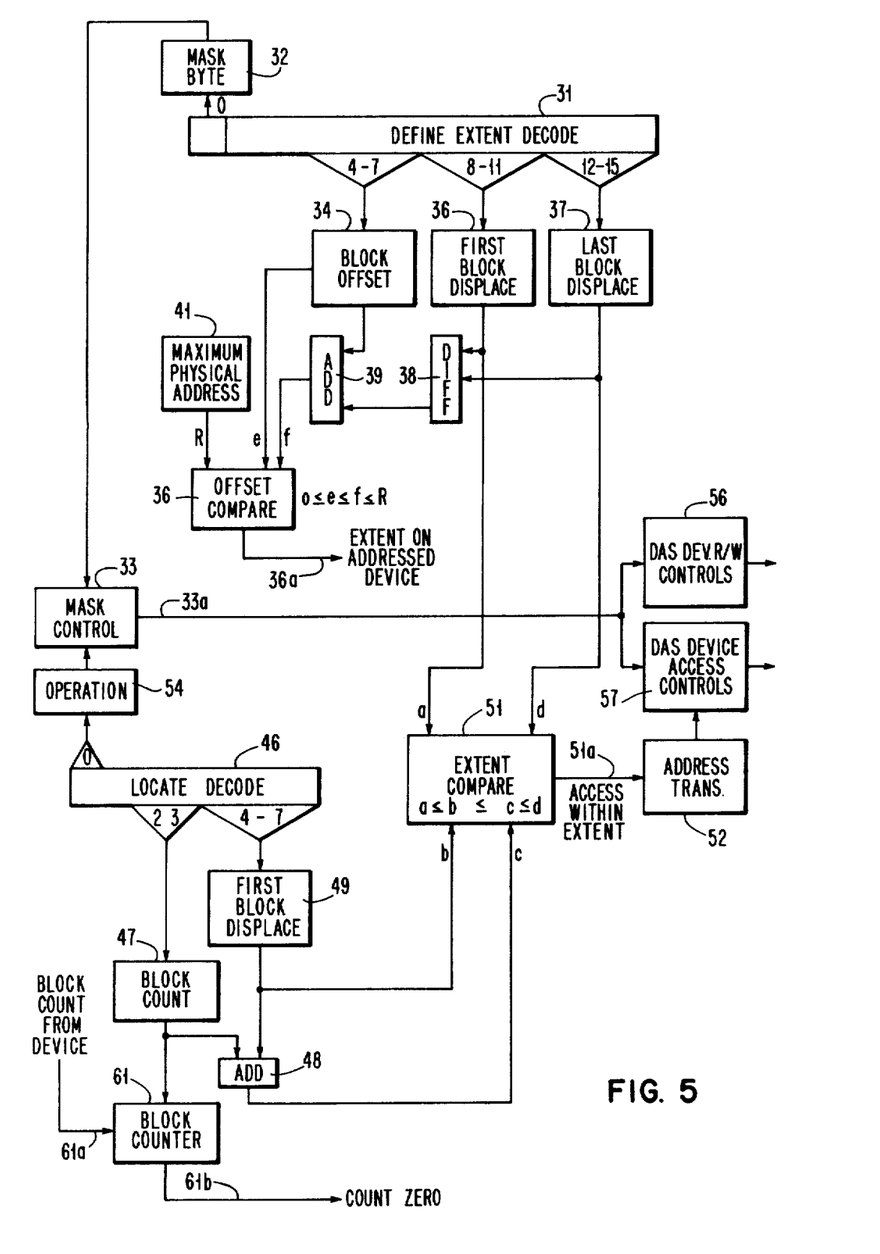
FIG. 5 is a block diagram illustrating diagrammatically the operation of the present invention.

FIG. 5 is a block diagram representation of the execution of the novel commands of this invention. The Define Extent command is decoded in circuitry 31 and the decoded outputs are used as follows. The mask byte decode output from circuitry 32 is supplied to mask control circuitry 33 where it is used to verify that the operation called for in the operation byte 0 of the Locate command is in fact permitted, as will be described below.

The decode of offset bytes 4–7 from circuitry 34 is supplied on a line (e) to offset compare circuitry 36. The decode of bytes 8–11 from circuitry 36 and the decode of bytes 12–15 from circuitry 37 are supplied to a difference circuitry 38 which supplies the difference between these counts to add circuitry 39. This difference count is added to the output of circuitry 34 and the sum is supplied on a line (f) to offset compare circuitry 36. Circuitry 36 also receives an input (R) from circuitry 41 representing the maximum physical address on the addressed DAS device. Compare circuitry 36 operates to produce an output on line 36a, indicating that the extent defined is on the addressed device, when the relationship $0 \leq e \leq f \leq R$ exists among the compared quantities.

The Locate command is decoded in circuitry shown diagrammatically at 46, although in practice, this circuitry could be part of the same circuitry 31 used to decode the preceding Define Extent command.

The Locate command block count decode from circuitry 47 is supplied as an input to add circuitry 48 which receives another input from the first block displacement (bytes 4–7) circuitry 49 of the Locate command. The output of add circuitry 48 is supplied as one input (c) to extent compare circuitry 51. Circuitry 51 also receives inputs (a), (d) and (b). Inputs (a) and (d) are supplied from circuitry 36 and 37, respectively, representing the displacements of the first and last blocks of the Define Extent command. Input (b) is supplied from circuitry 49 representing the displacement of the first block from the Locate command. Circuitry 51 is such that the relationship $a \leq b \leq c \leq d$ must prevail in order to raise output line 51a indicating that the access called for in the Locate command is within the extent defined in the Define Extent command. Line 51a supplies information to address translation circuitry 52 which converts the block address information into the proper physical values for the addressed DAS device.

The output of operation decode circuitry 54, representing the decode of operation byte 0 of the Locate command, is compared in mask control circuitry 33 to verify that the proposed operation is in fact permitted by the conditions of the mask byte. If the proposed operation is permitted, the operation decode is sent on a line 33a to access control circuitry 56 and read/write control circuitry 57 to begin initiation of an access operation and to condition the read/write circuitry of the selected device 16 for the desired operation.

Access control circuitry 57 also receives an input from device address translation circuitry 52. Assuming the mask control and access extent parameters are met, a SEEK operation may begin, and as discussed above, a SET SECTOR operation may be initiated for those DAS devices having Rotational Position Sensing.

After the desired location on the DAS device is reached, the operation may commence. As blocks of data are processed, a signal is produced on a line 61a of a block counter 61. The block count decode output from circuitry 47 is supplied as an input to block counter 61 to establish therein a block count corresponding to the number of blocks to be processed. Counter 61 receives a decrementing input on line 61a as blocks are processed on the DAS device until the counter reaches zero, indicating that the desired number of blocks have been processed. At this time, a line 61b is raised indicating the end of block processing for that operation.

The above description covered the situation in which a single CCW followed the new command pair of this invention. However, more than one CCW may follow the novel command pair, provided they are associated with sequential data which is located within the storage area defined by the Define Extent command. Thus, a number of READ CCW's or WRITE CCW's could follow a given Locate command. Typically, multiple READ or WRItE CCW's are chained together to effect data transfer to/from nonsequential locations in the CPU main memory. Additionally, more than one Locate command may be used with one Define Extent command, again provided that the operation or operations called for in the Locate commands are to be performed within the storage boundaries defined by the Define Extent command.

Figure 6:
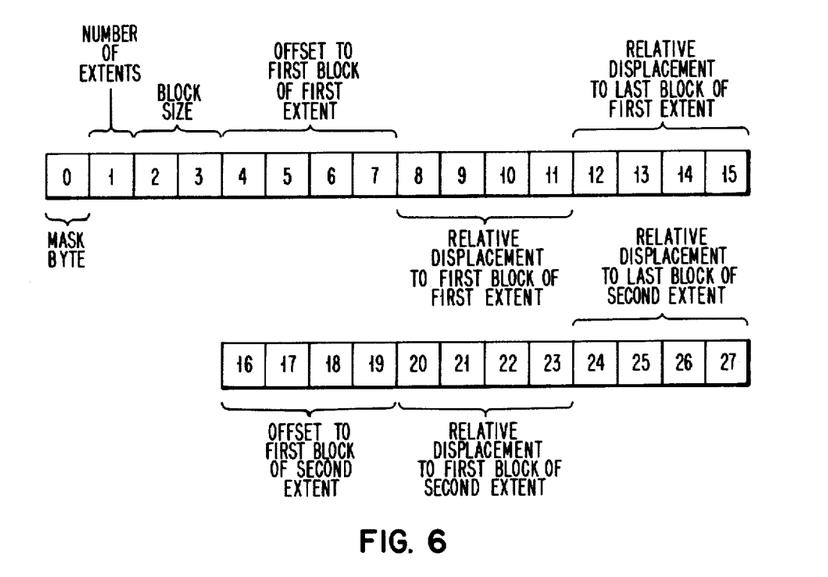
FIG. 6 illustrates a representative "Define Extent" command which defines two extents.

From the above description, it can be seen that the use of the commands of the present invention permit the carrying out of operations on DAS devices 16 under the control of control device 14 with considerably less intervention by CPU 11 than formerly was required. In the example described above, only one extent was employed with the Define Extent command. However, FIG. 6 illustrates a Define Extent command capable of defining two extents. This command includes 28 bytes, 0-27, with the bytes 0-15 having the same function as in the embodiment of FIG. 2. Bytes 4-16 define the parameters for the first defined extent and bytes 16-27 define the parameters for the second extent defined. Bytes 16-19 define the offset to the first block of the second extent, while bytes 20-23 and bytes 24-27, define the relative displacements within the user's data set to the first and last blocks of the second extent, respectively. The command shown in FIG. 6 thus defines two extent areas. This form of command could be used, for example, to define the range of user data covered by user records 0-149 in FIG. 3 and to gain access to some or all of that data with one Define Extent command.

We claim:

1. A method for minimizing the number of interruptions of a central processing unit in the transfer of equal length blocks of data between the central processing unit main memory and a storage device over a path including a control device between the central processing unit and the storage device, the operating system of the central processing unit initiating said transfer thereby causing control to be relinquished to a series of commands, a chain of commands being, in turn, sent to the control device for selecting and accessing the storage device and effectuating the data transfer, each access outside of prescribed storage boundaries on the storage device requiring the chain of commands to be restarted with a central processing unit initiative wherein the method comprises the steps of:

transferring information defining a storage boundary extent on said storage device in a first command from said central processing unit to said control device, transferring information in a second command from said central processing unit to said control device which defines a storage area within said storage boundary extent defined in said first command, and said second command also transferring information relative to the number of said blocks of data on said storage device which are to be the subject of the data transfer operation.

2. A method in accordance with claim 1, including the steps of storing in said control device the defined storage boundary extent transferred in said first command, comparing the defined storage area transferred in said second command with the storage boundary extent to determine whether said storage area defined in said second command is within the extent defined in said first command.

3. A method in accordance with claim 1, including the step of transferring information in a third command from said central processing unit to said control device specifying an operation to be performed on said data within the storage area defined in said second command.

4. A method in accordance with claim 1, including the steps of transferring from said central processing unit to said control device a series of commands subsequent to said second command, each series of commands producing the data transfer operation specified in said second command on data located within said storage area defined by said second command.

5. A method in accordance with claim 3, including the step of transferring information in a fourth command from said central processing unit to said control device which defines a second storage area within said storage boundary extent defined in said first command.

6. A method in accordance with claim 5, including the step of transferring a fifth command from said central processing unit to said control device specifying an operation to be performed on said data within said second storage area.

7. A method for minimizing the number of interruptions of a central processing unit in the transfer of equal length blocks of user data between the central processing unit main memory and a storage device over a path including a control device between the central processing unit and the storage device, the storage device having a number of equal length record storage blocks therein, each such block having a physical address associated therewith, the user data being arranged in blocks on the storage device, each user data block having a logical address associated therewith, the operating system of the central processing unit initiating said transfer thereby causing control to be relinquished to a series of commands, a chain of commands being, in turn, sent to the control device for selecting and accessing the storage device and effectuating the data transfer, each access outside of prescribed storage boundaries on the storage device requiring the chain of commands to be restarted with a new central processing unit initiative, wherein the method comprises the steps of:

transferring information in a first command from said central processing unit to said control device defining a storage boundary extent on said storage device, said boundary extent being defined in terms of a physical address in said storage device and in terms of logical address information relative to said user data blocks, transferring information in a second command from said central processing unit to said control device which defines a storage area within said storage boundary extent defined in said first command; and transferring information in a third command from said central processing unit to said control device specifying an operation to be performed on said data within the storage area defined in said second command.

8. A method in accordance with claim 7, including the steps of transferring from said central processing unit to said control device a series of commands subsequent to said second command, each said series of commands producing the data transfer operation specified in said second command on data located within said storage area defined by said second command.

9. A method in accordance with claim 7, including the step of transferring information in a fourth command from said central processing unit to said control device which defines a second storage area within said storage boundary extent defined in said first command.

* * * * *